US008214330B2

(12) United States Patent
Imamichi (10) Patent No.: US 8,214,330 B2
(45) Date of Patent: Jul. 3, 2012

(54) INFORMATION PROCESSING APPARATUS, INFORMATION PROCESSING METHOD, AND COMPUTER PROGRAM PRODUCT (75) Inventor: Takahiro Imamichi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 303 days.

(21) Appl. No.: 12/629,303

(22) Filed: Dec. 2, 2009

(65) Prior Publication Data
US 2010/0198786 A1     Aug. 5, 2010

(30) Foreign Application Priority Data

Feb. 2, 2009   (JP) ................................ 2009-021596

(51) Int. Cl.
*G06F 7/00*     (2006.01)
*G06F 17/00*    (2006.01)

(52) U.S. Cl. ........................................ 707/638; 707/806
(58) Field of Classification Search .................. None
See application file for complete search history.

(56) References Cited

U.S. PATENT DOCUMENTS

| 5,692,129 | A  | * | 11/1997 | Sonderegger et al. ............. 1/1 |
| 6,460,052 | B1 | * | 10/2002 | Thomas et al. .............. 707/695 |
| 6,480,865 | B1 | * | 11/2002 | Lee et al. .................... 715/234 |
| 6,615,223 | B1 | * | 9/2003  | Shih et al. .................... 707/625 |
| 6,691,137 | B1 | * | 2/2004  | Kishi ............................... 1/1 |
| 7,529,887 | B1 | * | 5/2009  | Haase et al. ................ 711/114 |
| 8,005,878 | B2 | * | 8/2011  | Chen et al. .................. 707/806 |
| 2002/0143785 | A1 | * | 10/2002 | Pugh .............................. 707/102 |
| 2003/0014433 | A1 | * | 1/2003  | Teloh et al. .................. 707/204 |
| 2005/0216884 | A1 | * | 9/2005  | Tchochiev .................... 717/106 |
| 2005/0251523 | A1 | * | 11/2005 | Rajamani et al. ............. 707/100 |
| 2005/0278338 | A1 | * | 12/2005 | Todorova et al. ............... 707/10 |
| 2006/0047720 | A1 | * | 3/2006  | Kulkarni et al. .............. 707/204 |
| 2006/0218177 | A1 | * | 9/2006  | Chang et al. ................. 707/102 |
| 2006/0225029 | A1 | * | 10/2006 | Flatow ......................... 717/104 |
| 2007/0033594 | A1 | * | 2/2007  | Allen et al. ................... 719/318 |
| 2007/0043749 | A1 | * | 2/2007  | Gerber et al. ................ 707/101 |
| 2007/0188824 | A1 |   | 8/2007  | Imamichi |

(Continued)

FOREIGN PATENT DOCUMENTS
JP            7-200381          8/1995
(Continued)

OTHER PUBLICATIONS

Schema Matching using Duplicates, Bilke et al, Proceedings of the 21st International Conference on Data Engineering (ICDE 2005), 2005.*

*Primary Examiner* — Pierre Vital
*Assistant Examiner* — Augustine K Obisesan
(74) *Attorney, Agent, or Firm* — Oblon, Spivak, McClelland, Maier & Neustadt, L.L.P.

(57) ABSTRACT

An information processing apparatus includes a generating unit that, based on schema information defining a structure of an object, generates the object that has a duplicating function for generating a clone as a copy of self. There is a receiving unit that receives a generation request for generating the object and a requesting unit that requests generation of the clone to the object when the duplicating function of the object for which the generation request is received is determined to be available. Further, there is an output unit that outputs the clone generated by the object, whose duplicating function is determined to be available, to a source that has issued the generation request for generating the object.

9 Claims, 7 Drawing Sheets

U.S. PATENT DOCUMENTS

| | | |
|---|---|---|
| 2008/0040311 A1 | 2/2008 | Imamichi |
| 2008/0147625 A1* | 6/2008 | Altounian et al. ............. 707/4 |
| 2008/0168441 A1 | 7/2008 | Imamichi |
| 2008/0180733 A1 | 7/2008 | Imamichi |
| 2008/0276234 A1* | 11/2008 | Taylor et al. ............. 717/177 |
| 2008/0282065 A1 | 11/2008 | Imamichi |
| 2009/0210859 A1 | 8/2009 | Imamichi |

FOREIGN PATENT DOCUMENTS

| | | |
|---|---|---|
| JP | 2002-149450 | 5/2002 |
| JP | 2004-30179 | 1/2004 |
| JP | 4137366 | 6/2008 |

* cited by examiner

| SCHEMA NAME | DUPLICATION-SOURCE OBJECT LINK | USAGE INFORMATION |
|---|---|---|
| USER DATA | 00015843 | Y |
| DOC DATA | 2156885 | Y |
| LOG DATA | NONE | N |

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2009-021596 filed in Japan on Feb. 2, 2009.

BACKGROUND OF THE INVENTION

1. Field of the Invention

The present invention relates to a database updating technology, and particularly relates to an information processing apparatus that performs updating of an object oriented database (OODB), to an information processing method performed by the information processing apparatus, and to a computer program product causing a computer to execute the information processing method.

2. Description of the Related Art

In recent years, an OODB model that is used in managing objects, each being a compilation of attributes, relations, and procedures, is becoming a mainstream database model.

Typically, in an OODB, schema information that defines object structures is managed in a corresponding manner with the objects. Thus, when changes are made to the schema information of a particular object, it also becomes necessary to make changes to the object corresponding to that schema information.

For example, Japanese Patent Application Laid-open No. H07-200381 discloses a technology in which information regarding changes in the attributes, relations, and procedures that occur with changes in the schema information is retained as a component object. That enables making changes to the attributes, relations, and procedures in the objects independently of the changes in the schema information. For that reason, the changes to the schema information can be performed in a speedy manner.

Meanwhile, when changes are made to the schema information, it is necessary to reflect the changed schema information in the corresponding objects in original form. However, although the technology disclosed in Japanese Patent Application Laid-open No. H07-200381 enables making changes to the schema information in a speedy manner; no improvement is achieved regarding the object generation processing that occurs on a frequent basis. Because of that, each time an object generation request is received; the object generation processing needs to be performed based on the schema information thereby making it difficult to perform high-speed processing with respect to the object generation request. Particularly, in an embedded device having a limited-capacity central processing unit (CPU), it is difficult to perform high-speed processing with respect to object generation requests.

SUMMARY OF THE INVENTION

It is an object of the present invention to at least partially solve the problems in the conventional technology.

According to an aspect of the present invention, there is provided an information processing apparatus including: a generating unit that, based on schema information defining a structure of an object, generates the object that has a duplicating function for generating a clone as a copy of self; a receiving unit that receives a generation request for generating the object; a requesting unit that requests generation of the clone to the object when the duplicating function of the object for which the generation request is received is determined to be available; and an output unit that outputs the clone generated by the object, whose duplicating function is determined to be available, to a source that has issued the generation request for generating the object.

According to another aspect of the present invention, there is provided an information processing method for processing information in an information processing apparatus that includes a generating unit, a receiving unit, a requesting unit, and an output unit, the method including: generating, based on schema information defining a structure of an object, the object that has a duplicating function for generating a clone as a copy of self by the generating unit; receiving a generation request for generating the object by the receiving unit; requesting generation of the clone to the object when the duplicating function of the object for which the generation request is received is determined to be available by the requesting unit; and outputting the clone generated by the object, whose duplicating function is determined to be available, to a source issuing the generation request for generating the object by the output unit.

According to still another aspect of the present invention, there is provided a computer program product including a computer-usable medium having computer-readable program codes embodied in the medium for processing information in an information processing apparatus that includes a generating unit, a receiving unit, a requesting unit, and an output unit, the program codes when executed causing a computer to execute: generating, based on schema information defining a structure of an object, the object that has a duplicating function for generating a clone as a copy of self by the generating unit; receiving a generation request for generating the object by the receiving unit; requesting generation of the clone to the object when the duplicating function of the object for which the generation request is received is determined to be available by the requesting unit; and outputting the clone generated by the object, whose duplicating function is determined to be available, to a source issuing the generation request for generating the object by the output unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an information processing apparatus, an information processing method performed by the information processing apparatus, and a computer program product causing a computer to execute the information processing method according to the present invention are described in detail below with reference to the accompanying drawings. In the following embodiments, the information processing apparatus is assumed to be a personal computer (PC). However, the present invention can also be implemented for an apparatus such as a server that manages objects stored in a database.

Figure 1:
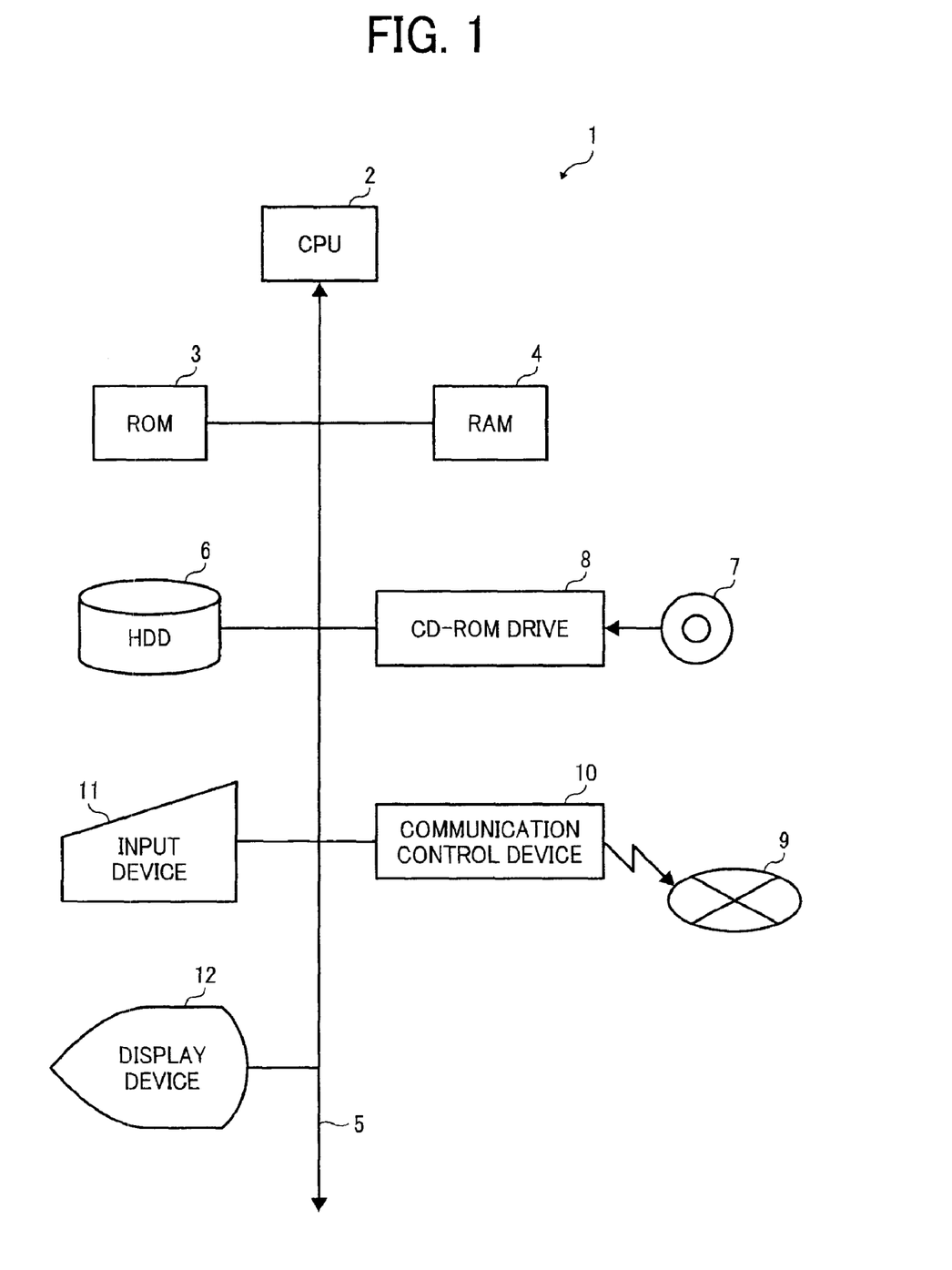
FIG. 1 is a block diagram of a hardware configuration of a PC according to a first embodiment.

FIG. 1 is a block diagram of a hardware configuration of a PC according to a first embodiment. A PC 1 according to the present embodiment includes a CPU 2 that intensively controls each essential part of the computer. To the CPU 2 are connected a read only memory (ROM) 3 that is a read only memory used in storing the basic input/output system (BIOS) or the like, a random access memory (RAM) 4 that is used in storing a variety of data in a rewritable manner, and a bus 5.

Moreover, to the bus 5 are connected, via an I/O (not illustrated), a hard disk drive (HDD) 6 that is used to store various programs; a compact disk-read only memory (CD-ROM) drive 8 that, as a mechanism for reading distributed programs such as computer software, is used to read a CD-ROM 7; a communication control device 10 that controls the communication between the PC 1 and a network 9; an input device 11 such as a keyboard or a mouse that is used in instructing various operations; and a display device 12 such as a cathode ray tube (CRT) or a liquid crystal display (LCD) that is used in displaying a variety of information.

Since the RAM 4 has a property of storing a variety of data in a rewritable manner, it functions as a work area for the CPU 2, that is, serves as a buffer for the CPU 2.

The CD-ROM 7 is the memory medium in the computer program product of the present invention and is used to store an operating system (OS) or various programs. The CPU 2 reads the programs stored in the CD-ROM 7 with the CD-ROM drive 8 and installs them in the HDD 6.

Meanwhile, as an alternative memory medium which is a non-transitory computer-usable medium in the computer program product to the CD-ROM 7; it is possible to use any one of different types of media including a variety of optical disks such as a digital versatile disk (DVD), a variety of magnetic optical disks, a variety of magnetic disks such as a flexible disk, and a semiconductor memory. Alternatively, it is also possible to download the programs from over the network 9 such as Internet via the communication control device 10 and then install the programs in the HDD 6. In that case, a memory device used to store the programs in the server at the transmitting side is also the memory medium of the present invention. Moreover, the programs can be configured to be executable on a predetermined OS. In that case, the programs may instruct the OS to execute a part of a variety of processing tasks described later or may be included as a part of a group of program files that configure a predetermined application software or the OS.

The CPU 2 that controls system operations in entirety executes a variety of processing tasks based on the programs loaded in the HDD 6, which is used as the main memory device of the system.

Given below is the description of the characteristic functions of the PC 1 according to the present embodiment from among the functions that the CPU 2 is asked to perform by the various programs installed in the HDD 6 of the PC 1.

Figure 2:
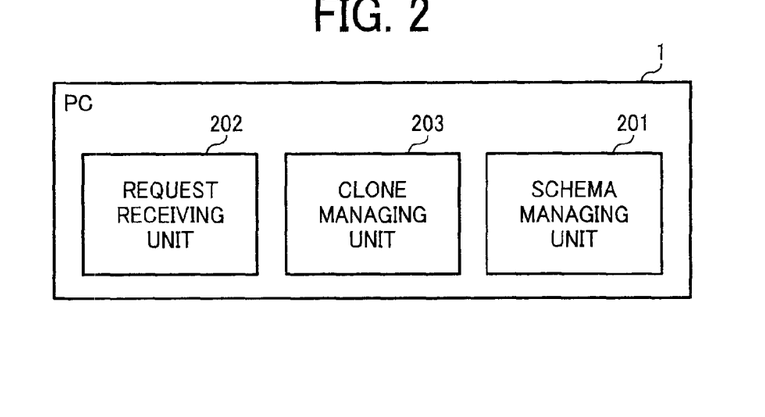
FIG. 2 is a block diagram of a functional configuration of the PC.

FIG. 2 is a block diagram of a functional configuration of the PC 1. As illustrated in FIG. 2, the PC 1 according to the present invention follows instructions of an object generation program and puts into practice a schema managing unit 201, a request receiving unit 202, and a clone managing unit 203.

The schema managing unit 201 is a unit that, based on schema information defining the structure of an object, generates the object that has a duplicating function for generating a clone as a copy of itself. In addition, upon the issue of a schema information change request, the schema managing unit 201 makes changes to the schema information that is stored in a corresponding manner with the object in an OODB. Moreover, each time the schema information is changed, the schema managing unit 201 generates the object based on the changed schema information. Then, the schema managing unit 201 requests the clone managing unit 203 described later to upgrade the clone that has been generated by the object corresponding to the changed schema information.

The request receiving unit 202 receives an object generation request via the input device 11 and makes an inquiry to the clone managing unit 203 described later about whether the duplicating function is available in the object for which the object generation request is received. When the duplicating function is available in the object for which the object generation request is received, the request receiving unit 202 issues a clone generating request to the clone managing unit 203 and then outputs the generated clone to the source of the object generation request (e.g., display device 12). When the duplicating function is not available in the object for which the object generation request is received, the request receiving unit 202 issues an object generating request to the schema managing unit 201 and then outputs the generated object to the source of the object generation request (e.g., display device 12). Moreover, each time object generation is performed based on the schema information, the request receiving unit 202 requests the clone managing unit 203 to register usage information that can be referred to for determining whether the duplicating function is available in the generated object.

Figure 3:
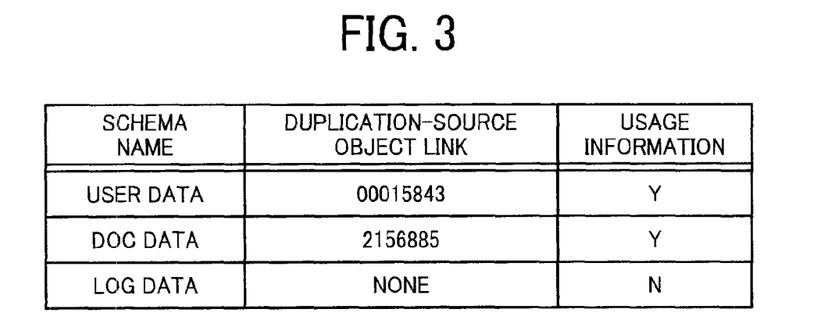
FIG. 3 is a schematic diagram of exemplary usage information stored by a clone managing unit.

The clone managing unit 203 manages, for each of the schema information, the usage information of the corresponding object that functions as a source for clone duplication. More particularly, the clone managing unit 203 stores the usage information in response to the usage information registration request issued by the request receiving unit 202. FIG. 3 is a schematic diagram of exemplary usage information stored by the clone managing unit 203. In the present embodiment, as illustrated in FIG. 3, the clone managing unit 203 stores the usage information ("YES (Y)" or "NO (N)") in a corresponding manner with information (e.g., "schema name") for identifying the schema information used in generating an object and a duplication-source object link (e.g., "address value") that is information for identifying the object that has generated a clone. In this way, the clone managing unit 203 holds only the links to each object as a source for clone duplication. That makes it possible to freely change the destination to save the instance of that object.

Herein, according to the input from the input device 11, the usage information is made selectable between "YES (Y)" and "NO (N)". When "N" is selected as the usage information, the "address value" is set to "none".

Meanwhile, the instance of an object managed by the clone managing unit 203 is not limited to an instance present in the memory area inside the PC 1 but can also be an instance present in the memory area of the server (not illustrated) that is connected via the network 9.

Upon receiving an inquiry from the request receiving unit 202 about whether the duplicating function is available in the object for which the object generation request is received, the clone managing unit 203 refers to the usage information to determine whether the duplicating function is available in the object for which the object generation request is received. If the clone managing unit 203 has stored the usage information of the object for which the object generation request is received and if that usage information indicates "Y", then the clone managing unit 203 notifies to the request receiving unit 202 that the duplicating function is available in that object. Moreover, by referring to the schema information and the address value stored in a corresponding manner with the object for which the object generation request is received, the clone managing unit 203 accesses that object and requests it to generate a clone.

Figure 4:
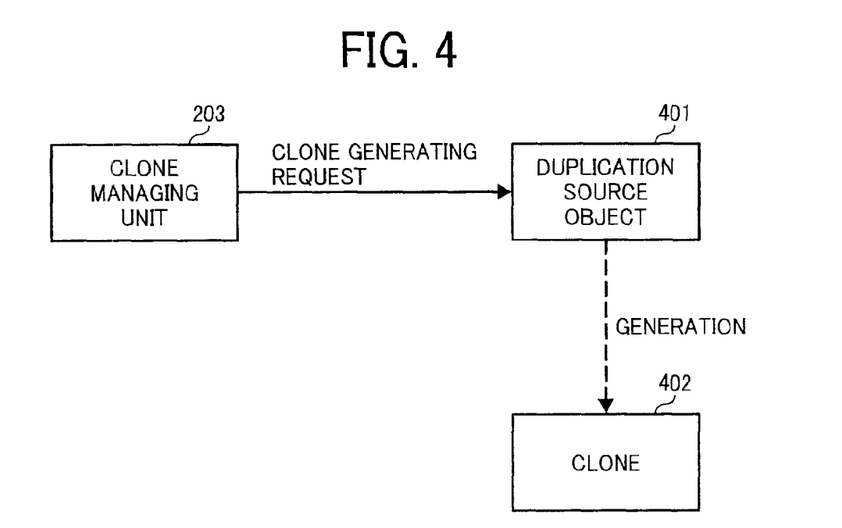
FIG. 4 is a schematic diagram for explaining an outline of clone generation processing.

FIG. 4 is a schematic diagram for explaining the outline of clone generation processing. First, the clone managing unit 203 issues a clone generating request to a duplication source object 401. Then, the duplication source object 401 generates a clone 402 using the duplicating function thereof.

Figure 5:
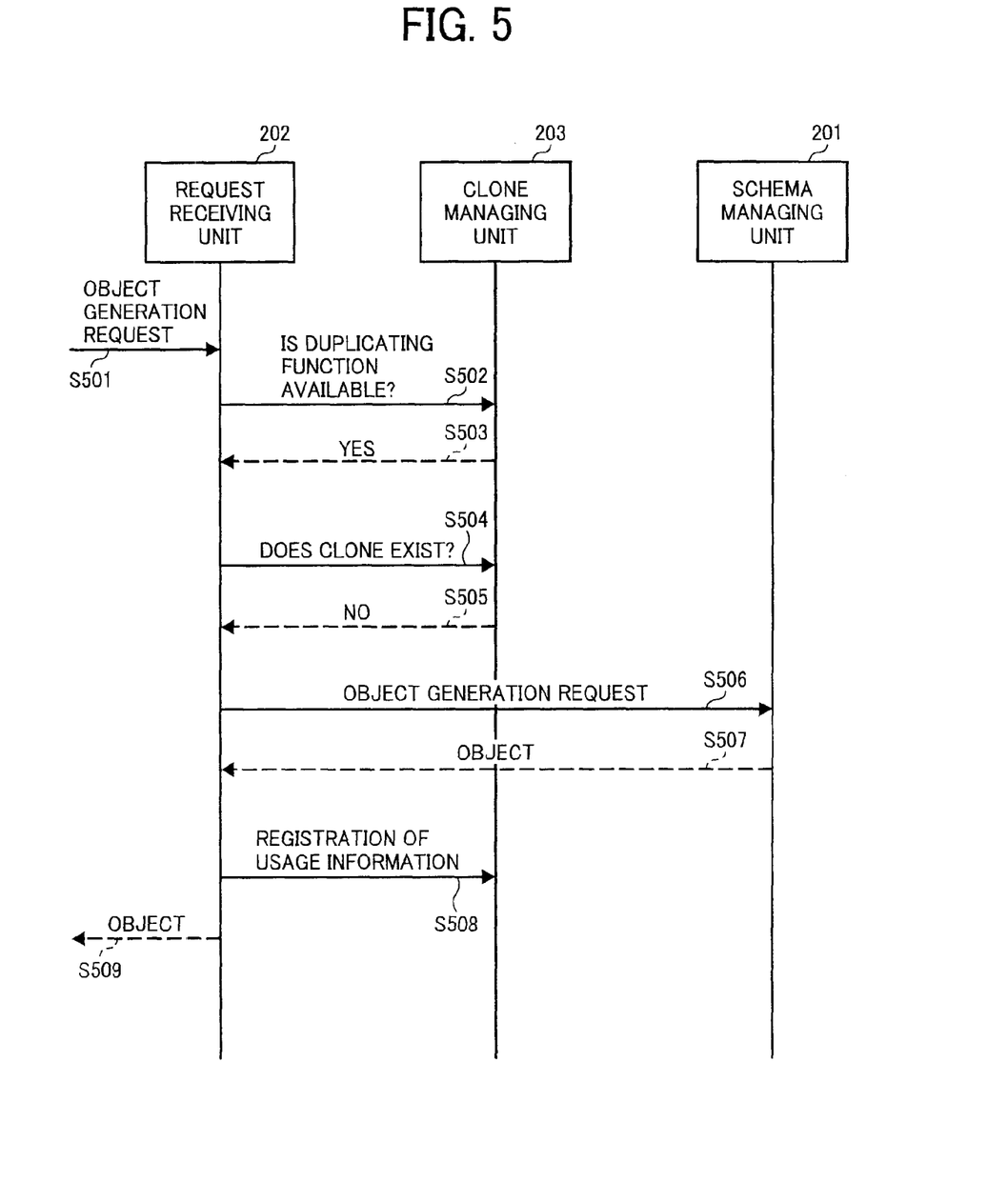
FIG. 5 is a sequence diagram for explaining a sequence of object generation processing and usage information registration processing.

Given below is the description with reference to FIG. 5 about the sequence of object generation processing and usage information registration processing. FIG. 5 is a sequence diagram for explaining the sequence of object generation processing and usage information registration processing.

First, the request receiving unit 202 receives an object generation request via the input device 11 (Step S501) and makes an inquiry to the clone managing unit 203 about whether the duplicating function is available in the object for which the object generation request is received (Step S502).

Upon receiving an inquiry from the request receiving unit 202; the clone managing unit 203 determines, by referring to the usage information stored in advance, whether the duplicating function is available in the object for which the object generation request is received and, if the duplicating function is determined to be available in the object for which the object generation request is received, then notifies the same ("Yes") to the request receiving unit 202 (Step S503). Meanwhile, although not illustrated in FIG. 5, each time the duplicating function is determined to be unavailable in the object for which the object generation request is received; then the request receiving unit 202 issues an object generation request to the schema managing unit 201.

Upon receiving the notification that the duplicating function is available in the object, the request receiving unit 202 confirms with the clone managing unit 203 whether there already exists a clone of the object for which the object generation request is received (Step S504). Then, the clone managing unit 203 refers to the history of clone generation requests issued with respect to objects and verifies whether there already exists a clone of the object for which the object generation request is received. If the clone does not exist, then the clone managing unit 203 notifies the same ("No") to the request receiving unit (Step S505).

On the other hand, if the clone is determined to already exist, then the clone managing unit 203 sends that clone, which has already been generated by the object for which the object generation request is received, to the request receiving unit 202. That eliminates the need to request schema-information-based object generation processing to the schema managing unit 201 at each receipt of an object generation request. Thus, the overall performance of the object generation processing can be improved.

When the request receiving unit 202 receives from the clone managing unit 203 the notification that the clone does not exist ("No"), it requests the schema managing unit 201 to generate the object (Step S506). Then, the schema managing unit 201 generates the object for which the object generation request is received and sends it to the request receiving unit 202 (Step S507). Meanwhile, at the time of requesting the schema managing unit 201 to generate the object, the request receiving unit 202 specifies the information (e.g., "schema name") for identifying the schema information used in generating that object.

Then, the request receiving unit 202 issues a usage information registration request to the clone managing unit 203 (Step S508) and outputs the object received from the schema managing unit 201 to the display device 12 (Step S509). In this way, by registering the usage information of the object during object generation processing, it becomes possible to reduce the cost related to the usage information registration.

Figure 6:
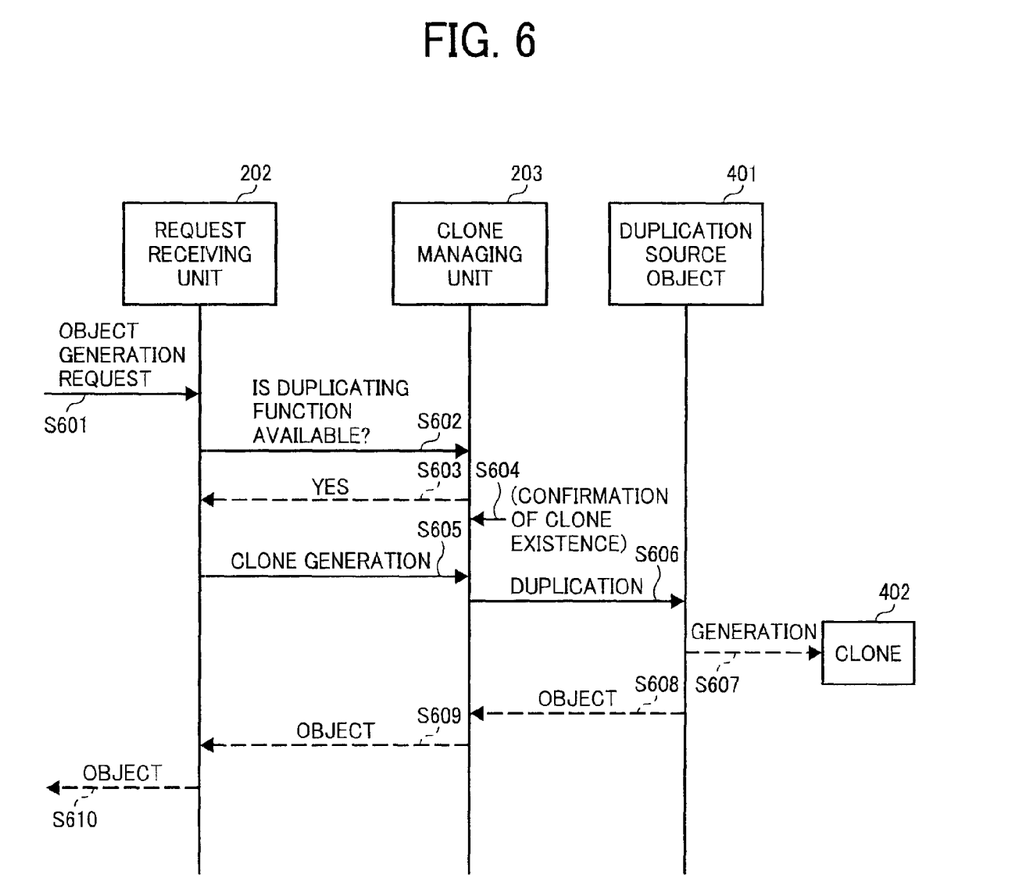
FIG. 6 is a sequence diagram for explaining a sequence of clone generation processing.

Given below is the description with reference to FIG. 6 about the sequence of clone generation processing. FIG. 6 is a sequence diagram for explaining the sequence of clone generation processing.

First, the request receiving unit 202 receives an object generation request via the input device 11 (Step S601) and makes an inquiry to the clone managing unit 203 about whether the duplicating function is available in the object for which the object generation request is received (Step S602).

Upon receiving an inquiry from the request receiving unit 202; the clone managing unit 203 determines, by referring to the usage information stored in advance, whether the duplicating function is available in the object for which the object generation request is received and, if the duplicating function is determined to be available in the object for which the object generation request is received, then notifies the same ("Yes") to the request receiving unit 202 (Step S603). Besides, the clone managing unit 203 refers to the history of clone generation requests issued with respect to objects and verifies whether there already exists a clone of the object for which the object generation request is received (Step S604).

Upon receiving the notification that the duplicating function is available in the object, the request receiving unit 202 requests the clone managing unit 203 to generate a clone of the object for which the object generation request is received (Step S605).

Upon receiving the clone generation request, the clone managing unit 203 requests the duplication source object 401 to generate a clone as a copy of itself (Step S606). Meanwhile, at the time of requesting the duplication source object 401 to generate a clone, the clone managing unit 203 can specify certain required attributes from among all attributes possessed by the object and then request the duplication source object 401 to generate a clone (object) having only the specified attributes. Moreover, if there has already been a clone of the object for which the object generation request is received, then the clone managing unit 203 can send that clone to the request receiving unit 202 without newly performing the clone generation processing.

Upon being requested to perform clone generation by the clone managing unit 203, the duplication source object 401 generates the clone 402 using the duplicating function thereof (Step S607). Moreover, upon receiving the information regarding the specified attributes, the duplication source object 401 generates an object (clone 402) having only the specified attributes. Then, the duplication source object 401 sends to the clone managing unit 203 the generated clone 402 as the object for which the object generation request is received (Step S608).

Subsequently, the clone managing unit 203 sends the clone 402 generated by the duplication source object 401 to the request receiving unit 202 as the object for which the object generation request is received (Step S609). The request receiving unit 202 then outputs the clone 402 received from the clone managing unit 203 to the display device 12 as the object for which the object generation request is received (Step S610). That eliminates the need for the schema managing unit 201 to perform schema-information-based object generation processing each time the request receiving unit 202 receives an object generation request. As a result, the object generation processing can be performed in a speedy manner.

Figure 7:
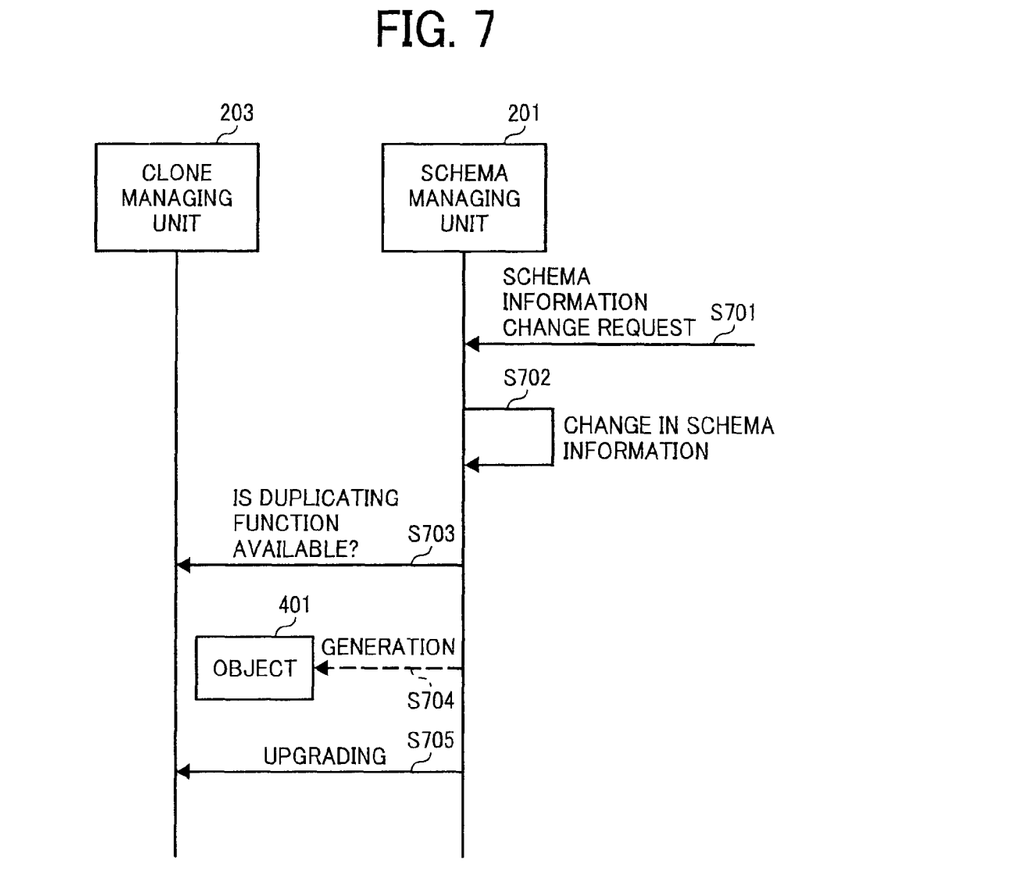
FIG. 7 is a sequence diagram for explaining a sequence of schema information change processing.

Given below is the description with reference to FIG. 7 about the sequence of schema information change processing. FIG. 7 is a sequence diagram for explaining the sequence of schema information change processing.

First, when a schema information change request is issued (Step S701), the schema managing unit 201 makes changes in the schema information (Step S702) and makes an inquiry to the clone managing unit 203 about whether the duplicating function is available in the object generated prior to making changes in the schema information (Step S703). Besides, the schema managing unit 201 generates the object (duplication source object 401) based on the changed schema information (Step S704). Thus, even if the schema information is changed on a frequent basis, it is sufficient for the schema managing unit 201 only to update the duplication source object 401. That enables achieving reduction in the time allotted to the updating of the object and improvement in the overall performance of the object generation processing.

If the duplicating function is available in the object generated prior to making changes in the schema information, then the schema managing unit 201 specifies the changed schema information to the clone managing unit 203 and requests the clone managing unit 203 to upgrade the corresponding clone (Step S705). Then, based on the specified schema information, the clone managing unit 203 upgrades the clone that has been generated by the object generated based on the changed schema information. Thus, even if changes are made to the schema information, a mismatch can be prevented from occurring between the structure of the duplication source object 401 and the structure of the clone 402.

In this way, according to the PC 1 in the present embodiment; when the duplicating function is available in the object for which the object generation request is received, the duplication source object 401 generates the clone 402. That eliminates the need for the schema managing unit 201 to perform schema-information-based object generation processing at each receipt of an object generation request. Thus, the performance of the object generation processing can be improved.

In a second embodiment, the present invention is implemented in a multi virtual machine (MVM) environment in which a plurality of Java (registered trademark) virtual machines operate in mutual cooperation. The MVM environment is adopted to ensure safety in case a plug-in by a third vendor intentionally or unintentionally affects the operations of the virtual machines in an adverse manner. Thus, by separating an in-house product from a virtual machine used for third vendor addition, the in-house product can be prevented from getting adversely affected by the third vendor. That requirement is of large significance considering the expandability and safety. Meanwhile, from the following description is eliminated the explanation regarding the contents such as the hardware configuration of the PC that are identical to the first embodiment. That is, only the contents specific to the second embodiment are explained below.

Figure 8:
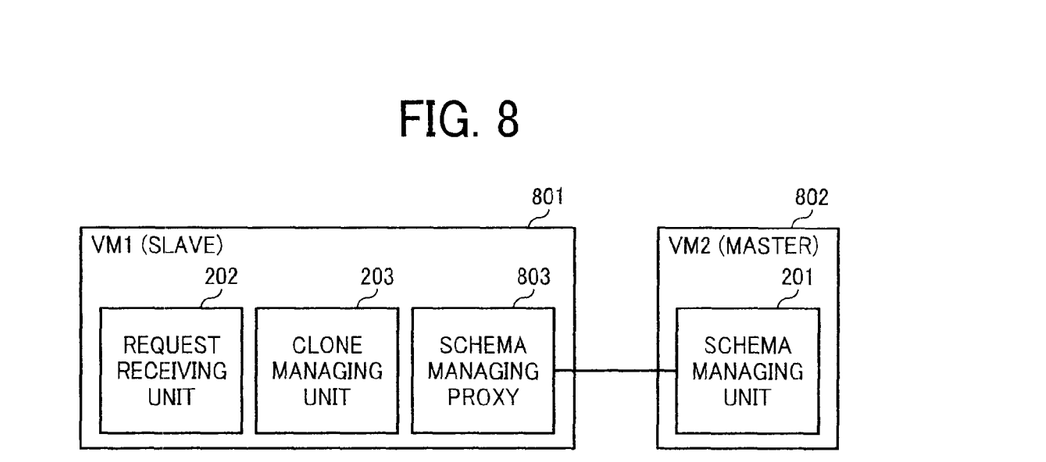
FIG. 8 is a schematic diagram of an example in which constituent elements illustrated in FIG. 2 are put into practice in an environment in which a plurality of virtual machines operates in mutual cooperation.

FIG. 8 is a schematic diagram of an example in which the constituent elements illustrated in FIG. 2 are put into practice in an environment in which a plurality of virtual machines operates in mutual cooperation. A VM1 (slave) 801 includes the request receiving unit 202, the clone managing unit 203, and a schema managing proxy 803. The processing performed in the request receiving unit 202 and the clone managing unit 203 is identical to that described in the first embodiment. Hence, that explanation is not repeated.

The schema managing proxy 803 enables establishing a connection between a VM2 (master) 802 and the VM1 (slave) 801 via the network 9 such as Internet. More particularly, the schema managing proxy 803 requests the VM2 (master) 802 to perform object generation processing and receives the generated object from the VM2 (master) 802.

The VM2 (master) 802 includes the schema managing unit 201. The processing performed in the schema managing unit 201 is identical to that described in the first embodiment. Hence, that explanation is not repeated.

Figure 9:
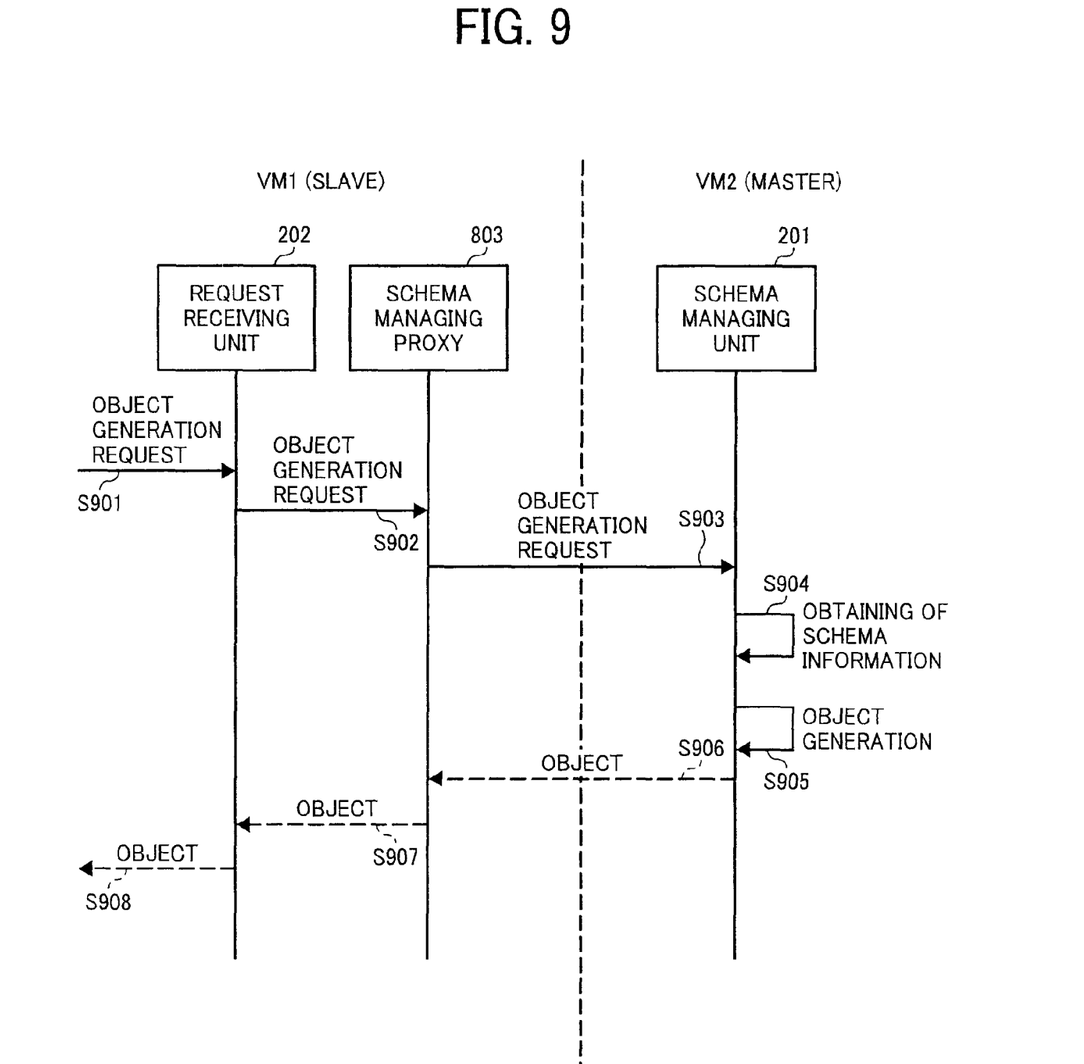
FIG. 9 is a sequence diagram for explaining conventional object generation processing in a multi virtual machine (MVM) environment.

Given below is the description with reference to FIG. 9 about conventional object generation processing in the MVM environment. FIG. 9 is a sequence diagram for explaining conventional object generation processing in the MVM environment.

First, the request receiving unit 202 receives an object generation request via the input device 11 (Step S901) and requests the schema managing proxy 803 to generate an object (Step S902). Herein, the request to generate an object is issued by specifying the schema information.

Upon being requested to generate an object, the schema managing proxy 803 issues an object generation request to the schema managing unit 201 in the VM2 (master) 802 via the network 9 (Step S903).

Upon receiving the object generation request, the schema managing unit 201 in the VM2 (master) 802 obtains the specified schema information (Step S904) and generates an object based on the obtained schema information (Step S905). Then, the schema managing unit 201 sends the generated object to the schema managing proxy 803 via the network 9 (Step S906).

The schema managing proxy 803 receives the object from the VM2 (master) 802 and sends it to the request receiving unit 202 (Step S907). The request receiving unit 202 then outputs the object received from the schema managing proxy 803 to the display device 12 (Step S908).

In this way, in the object generation processing performed in a conventional MVM environment, the schema information is intensively managed in only a single virtual machine so as to prevent a case when mismatch occurs between the schema information managed in each virtual machine. By necessity, the object generation processing is performed in the virtual machine that manages the schema information. Thus, at the time of performing the object generation processing, inter-process communication occurs between the virtual machines thereby leading to cost increase. Besides, the object generation processing takes a long time.

In comparison, in the object generation processing performed in the MVM environment according to the present embodiment; when the duplicating function is available in the object for which the object generation request is received, the object can be generated without having to perform inter-process communication. Besides, if changes are made to the schema information; then, in an identical manner to that according to the first embodiment, the schema managing unit 201 in the VM2 (master) 802 requests upgrading to the clone managing unit 203. Thus, even if changes are made to the schema information, it is possible to maintain the consistency in the structures of objects that are generated based on the same schema information.

Figure 10:
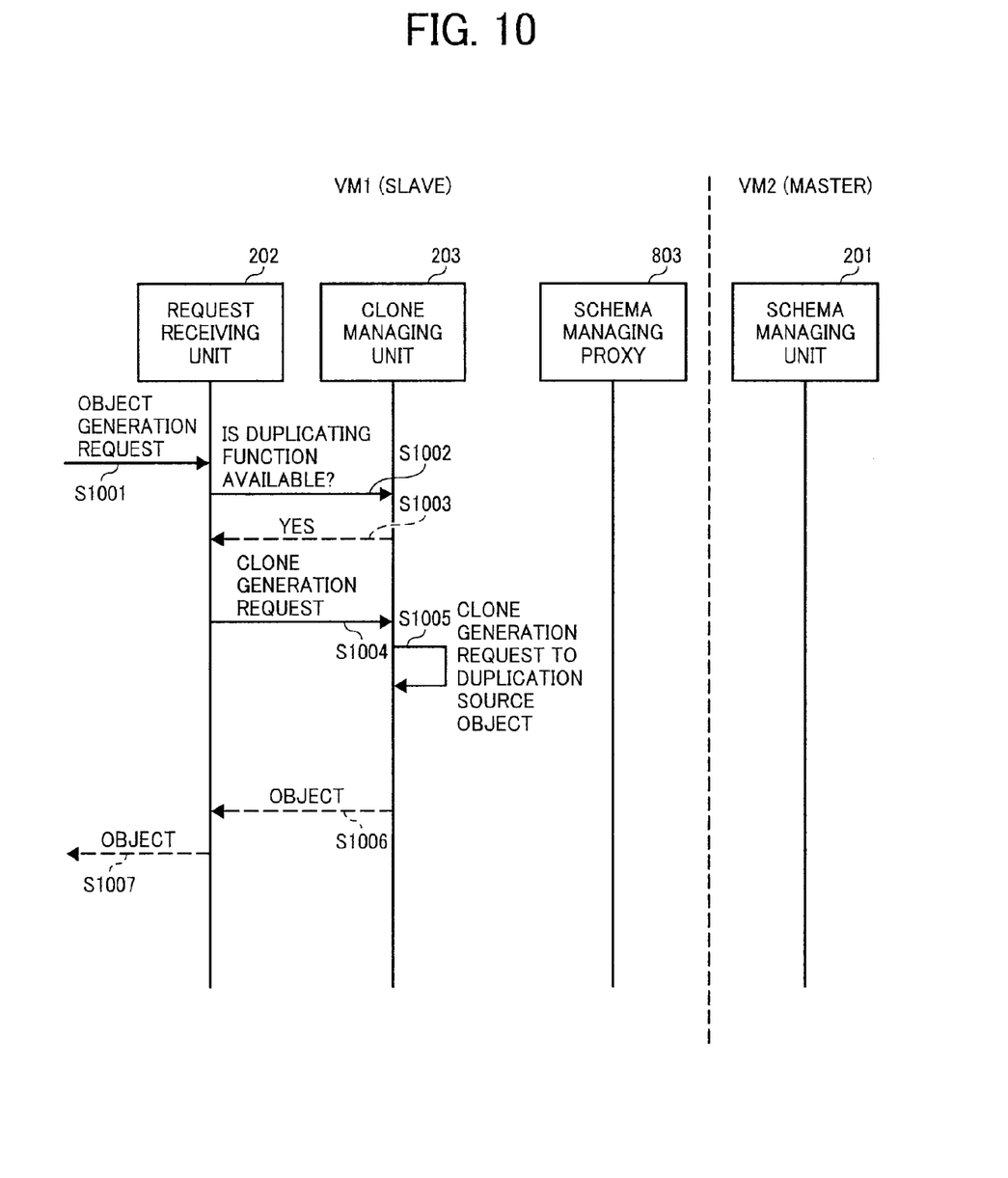
FIG. 10 is a sequence diagram for explaining object generation processing performed in an MVM environment according to a second embodiment.

Given below is the description with reference to FIG. 10 about the object generation processing performed in the MVM environment according to the present embodiment. FIG. 10 is a sequence diagram for explaining the object generation processing performed in the MVM environment according to the present embodiment.

First, the request receiving unit 202 receives an object generation request via the input device 11 (Step S1001) and makes an inquiry to the clone managing unit 203 about whether the duplicating function is available in the object for which the object generation request is received (Step S1002).

Upon receiving an inquiry from the request receiving unit 202; the clone managing unit 203 determines, by referring to the usage information stored in advance, whether the duplicating function is available in the object for which the object generation request is received and, if the duplicating function is determined to be available in the object for which the object generation request is received, then notifies the same ("Yes") to the request receiving unit 202 (Step S1003).

Upon receiving the notification that the duplicating function is available in the object, the request receiving unit 202 requests the clone managing unit 203 to generate a clone of the object for which the object generation request is received (Step S1004).

Upon receiving the clone generation request, the clone managing unit 203 requests the duplication source object 401 to generate the clone 402 (Step S1005). When the duplication source object 401 generates the clone 402, the clone managing unit 203 sends the clone 402 generated by the duplication source object 401 to the request receiving unit 202 as the object for which the object generation request is received (Step S1006).

The request receiving unit 202 then outputs the clone 402 received from the clone managing unit 203 to the display device 12 as the object for which the object generation request is received (Step S1007).

In this way, in the MVM environment according to the present embodiment; since the inter-process communication is not required at the time of performing the object generation processing, it is possible to prevent the cost increase attributed to the inter-process communication as well as perform the object generation processing in a speedy manner.

Meanwhile, the first and second embodiments can be implemented in a data processing unit of an image forming apparatus so that the speed of reading setting values of the copying function, the facsimileing function, the printing function, or the like as well as the speed of writing a log improves. As a result, the overall performance can be improved.

In this way, according to an aspect of the present invention; since the need to build objects based on schema information is eliminated, it is possible to achieve improvement in the performance of object generation processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer implemented information processing apparatus comprising:
   a memory;
   a generating unit, connected to the memory, that, based on schema information defining a structure of an object, generates the object that has a duplicating function for generating a clone as a copy of self;
   a receiving unit, connected to the memory, that receives a generation request for generating the object;
   a requesting unit, connected to the memory, that requests generation of the clone to the object when the duplicating function of the object for which the generation request is received is determined to be available; and
   an output unit, connected to the memory, that outputs the clone generated by the object, whose duplicating function is determined to be available, to a source that has issued the generation request for generating the object,
   wherein:
   the receiving unit receives a schema information change request,
   the generating unit
      changes the schema information upon receipt of the schema information change request and
      generates the object based on the schema information that has been changed, and
   the requesting unit, when determines the duplicating function of the object generated based on the schema information that has been changed is available, upgrades the clone generated by the object.

2. The information processing apparatus according to claim 1, further comprising
   a memory unit that stores therein usage information indicating whether the duplicating function of the object is available, wherein
   the requesting unit determines, according to the usage information stored in the memory unit, whether the duplicating function of the object for which the generation request is received is available.

3. The information processing apparatus according to claim 2, wherein
   when the duplicating function of the object for which the generation request is received is determined to be unavailable, the generating unit generates the object based on the schema information, and
   the output unit outputs the object generated by the generating unit to the source that has issued the generation request for generating the object.

4. An information processing method for processing information in an information processing apparatus that includes a generating unit, a receiving unit, a requesting unit, and an output unit, the method comprising:
   generating, based on schema information defining a structure of an object, the object that has a duplicating function for generating a clone as a copy of self by the generating unit;
   receiving a generation request for generating the object by the receiving unit;

requesting generation of the clone to the object when the duplicating function of the object for which the generation request is received is determined to be available by the requesting unit; and outputting the clone generated by the object, whose duplicating function is determined to be available, to a source issuing the generation request for generating the object by the output unit, wherein the receiving includes receiving a schema information change request, the generating includes changing the schema information upon receipt of the schema information change request and generating the object based on the schema information that has been changed, and the requesting includes, when the duplicating function of the object generated based on the schema information that has been changed is determined to be available, upgrading the clone generated by the object.

5. The information processing method according to claim 4, further comprising storing, in a memory unit, usage information indicating whether the duplicating function of the object is available, wherein the requesting includes determining, according to the usage information stored in the memory unit, whether the duplicating function of the object for which the generation request is received is available.

6. The information processing method according to claim 5, wherein the generating includes, when the duplicating function of the object for which the generation request is received is determined to be unavailable, generating the object based on the schema information, and the outputting includes outputting the object, generated at the generating, to the source that has issued the generation request for generating the object.

7. A computer program product comprising a non-transitory computer-usable medium having computer-readable program codes embodied in the medium for processing information in an information processing apparatus that includes a generating unit, a receiving unit, a requesting unit, and an output unit, the program codes when executed causing a computer to execute:

generating, based on schema information defining a structure of an object, the object that has a duplicating function for generating a clone as a copy of self by the generating unit;

receiving a generation request for generating the object by the receiving unit;

requesting generation of the clone to the object when the duplicating function of the object for which the generation request is received is determined to be available by the requesting unit; and outputting the clone generated by the object, whose duplicating function is determined to be available, to a source issuing the generation request for generating the object by the output unit;

wherein:

the receiving includes receiving a schema information change request, the generating includes changing the schema information upon receipt of the schema information change request and generating the object based on the schema information that has been changed, and the requesting includes, when the duplicating function of the object generated based on the schema information that has been changed is determined to be available, upgrading the clone generated by the object.

8. The computer program product according to claim 7, the program codes when executed causing the computer to further execute storing, in a memory unit, usage information indicating whether the duplicating function of the object is available, wherein the requesting includes determining, according to the usage information stored in the memory unit, whether the duplicating function of the object for which the generation request is received is available.

9. The computer program product according to claim 8, wherein the generating includes, when the duplicating function of the object for which the generation request is received is determined to be unavailable, generating the object based on the schema information, and the outputting includes outputting the object, generated at the generating, to the source that has issued the generation request for generating the object.

* * * * *